United States Patent  [19]
Hoheisel et al.

[10] Patent No.: US 6,778,632 B2
[45] Date of Patent: Aug. 17, 2004

(54) X-RAY DETECTOR/STRAY RADIATION GRID AND GAMMA DETECTOR/COLLIMATOR ARRANGEMENTS

(75) Inventors: Martin Hoheisel, Erlangen (DE); Hartmut Sklebitz, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 121 days.

(21) Appl. No.: 10/277,075

(22) Filed: Oct. 21, 2002

(65) Prior Publication Data

US 2003/0076929 A1 Apr. 24, 2003

(30) Foreign Application Priority Data

Oct. 23, 2001 (DE) .......................................... 101 51 562

(51) Int. Cl.[7] .............................................. H05G 1/64
(52) U.S. Cl. ...................................... 378/98.8; 378/154
(58) Field of Search .............................. 378/98.8, 145, 378/147, 149, 154, 155, 164, 204, 205; 250/505.1

(56) References Cited

U.S. PATENT DOCUMENTS

| | | | |
|---|---|---|---|
| 6,021,173 A | 2/2000 | Brauers et al. | 378/98.8 |
| 6,366,643 B1 * | 4/2002 | Davis et al. | 378/154 |
| 6,690,767 B2 * | 2/2004 | Davis | 378/154 |

FOREIGN PATENT DOCUMENTS

| | | |
|---|---|---|
| DE | 101 47 949 | 4/2003 |
| WO | WO 00/26922 | 5/2000 |

OTHER PUBLICATIONS

U.S. patent application Publication 2003/0072415.

* cited by examiner

Primary Examiner—David V. Bruce
Assistant Examiner—Courtney Thomas
(74) Attorney, Agent, or Firm—Schiff Hardin LLP

(57) ABSTRACT

In an arrangement having an X-ray detector or a gamma detector with detector elements arranged in a matrix in row and column directions that form a detector surface with detection regions that are sensitive to X-rays or gamma radiation and insensitive intermediate regions, and a stray radiation grid or collimator of absorbent structure elements that is arranged over the detector surface, the absorbent structure elements proceed over the intermediate regions and are fashioned such that their detector-side center-to-center spacing in the row direction and/or column direction is greater by a whole-numbered factor than the center-to-center spacing of the detector elements in the same direction, and/or sections of the absorbent structure elements that proceed in one direction exhibit a lower height than sections that proceed in the respectively other direction. Moiré effects can be avoided in the image exposure and, at the same time, a reduced primary radiation absorption by the stray radiation grid or collimator is achieved even given a moving radiation source.

21 Claims, 5 Drawing Sheets ns as optoelectrical receivers. Ideally, each picture element of the X-ray exposure should correspond to the attenuation of the X-rays by the subject on a straight-line axis from the punctiform X-ray source to a location at the detector surface corresponding to the picture element. X-rays that are incident on the X-ray detector that proceed on such a straight-line axis from the punctiform X-ray source are referred to as primary rays.

X-RAY DETECTOR/STRAY RADIATION GRID AND GAMMA DETECTOR/COLLIMATOR ARRANGEMENTS

BACKGROUND OF THE INVENTION

1. Field of the Invention

The present invention is directed to an examination arrangement of the type having an X-ray detector or a gamma detector with detector elements arranged in a matrix in rows and columns that form a detector surface with detection regions that are sensitive to X-rays or gamma radiation and having insensitive intermediate regions, and a stray radiation grid or collimator of absorbent structure elements that is arranged over the detector surface.

2. Description of the Prior Art

In X-ray image technology, high demands are currently made of the image quality of the X-ray exposures. For making such exposures, particularly as implemented in medical X-ray diagnostics, a subject to be examined is transirradiated by X-rays of an approximately punctiform X-ray source, and the attenuation distribution of the X-rays is two-dimensionally acquired at that side of the subject opposite the X-ray source. A line-by-line acquisition of the X-rays attenuated by the subject also can be undertaken, for example in computed tomography installations. In addition to X-ray films and gas detectors, solid-state detectors are being increasingly utilized, these usually having a matrix-like arrangement of optoelectronic semiconductor compone Due to unavoidable interactions, however, the X-rays emanating from the X-ray source are scattered in the subject, so that scattered rays, referred to as secondary rays, are also incident onto the detector in addition to the primary rays. These scattered rays, which can cause up to more than 90% of the overall signal modulation of an X-ray detector in diagnostic images dependent on properties of the subject, represent an additional noise source and therefore diminish the recognizability of fine contrast differences. This serious disadvantage of the stray radiation is due to a significant, additional noise component in the image exposure caused by the quantum property of the stray radiation.

For reducing the stray radiation incident on the detector, a stray radiation grid is introduced between the subject and the detector. Stray radiation grids are composed of regularly arranged structures that absorb X-rays and between which through channels or through slots are fashioned for the optimally unattenuated passage of the primary radiation. Given focused stray radiation grids, these through channels or through slots are directed toward the focus in conformity with the distance from the punctiform X-ray source, i.e. the distance from the focus of the X-ray tube. In unfocussed stray radiation grids, the through channels or through slots are arranged over the entire surface of the stray radiation grid perpendicular to the surface thereof. This, however, leads to a noticeable loss of primary radiation at the edges of the image exposure since a larger part of the incident primary radiation strikes the absorbent regions of the stray radiation grid at these locations.

Extremely high demands are made on the properties of X-ray stray radiation grids for achieving a high image quality. The scattered rays should be absorbed as well as possible; however, as much of the primary radiation as possible should pass through the stray radiation grid unattenuated. A reduction of the scattered rays incident on the detector surface can be achieved by a large ratio of the height of the stray radiation grid to the thickness or the diameter of the through channels or through slots, i.e. by a high shaft ratio. However, image disturbances due to absorption of a part of the primary radiation can occur because of the thickness of the absorbent structure or wall elements lying between the through channels or through slots. Especially given employment of solid-state detectors, inhomogeneities of the grid, i.e. deviations of the absorbent regions from their ideal position, lead to image disturbance due to an imaging of the grid in the X-ray image.

For minimizing image disturbances due to stray radiation grids, it is known to move the grids in the lateral direction during the exposure. Given extremely short exposure times of, for example, 1–3 ms, however, stripes still can occur in the image due to an inadequate motion velocity of the grids. Disturbing stripes due to the reversal of the motion direction of the grids during the exposure also can occur given very long exposure times.

The same problem arises in nuclear medicine, particularly in the employment of gamma cameras such as, for example, Anger cameras. Similar to X-ray diagnostics, care must also be exercised in the exposure technique to ensure that as few scattered gamma quanta as possible reach the detector. In contrast to X-ray diagnostics, the radiation source for the gamma quanta is located in the inside of the subject in nuclear diagnostics. The patient is injected with a metabolism preparation marked with certain unstable nuclides, which is metabolized organ-specifically. An image of the organ is then obtained by means of detecting the decay quanta emitted from the body. The time curve of the activity in the organ allows conclusions about its function to be made. A collimator that defines the projection direction of the image must be introduced in front of the gamma detector for obtaining an image of the interior of the body. In terms of function and structure, such a collimator corresponds to the stray radiation grid in X-ray diagnostics. Only the gamma quanta defined by the privileged direction of the collimator can pass the collimator; quanta incident at an angle thereto are absorbed in the collimator. Due to the higher energy of the gamma quanta compared to X-ray quanta, collimators must be implemented with multiply higher absorption capability than stray radiation grids for X-radiation.

Scattered quanta can thus be excluded by only quanta having a specific energy being taken into consideration in the image. However, every detected stray quantum causes a dead time of the gamma camera of, for example a microsecond during which no further events can be registered. Therefore, when a primary quantum arrives shortly after the registration of a stray quantum, it cannot be registered and is lost for the image. A similar effect also arises when a stray quantum coincides in time—within certain limits—with a primary quantum. Since the evaluation electronics then no longer can separate the two events, too high an energy is determined and the event is not registered. Both of these occurrences require that a highly effective scattered ray suppression be provided to achieve an improved quantum efficiency in nuclear diagnostics. Further, an improved image quality is obtained for a given dosage of the applied radio-nuclide, or a lower radio-nuclide dosage can be used to obtain a given same image quality, so that the radiation exposure of the patient can be lowered and shorter image exposure times can be achieved.

Different detectors are utilized for the registration of medical projection X-ray images as well as for the registration of gamma quanta in nuclear medicine. In particular, solid-state detectors with detector elements arranged in row and column directions have recently been playing an important part. The detector elements are also referred to as pixels below. These detectors also require a stray radiation grid or collimator that blanks out scattered X-ray or gamma quanta.

Conventional grids made of lead lamellae have the problem that they are coarser than the pixel structure and are also too non-uniform, so that disturbing Moiré effects occur. The use of moving grids is complicated and also leads to a high absorption of the primary radiation.

U.S. Pat. No. 6,021,173 discloses an approach that is intended to avoid Moiré structures during operation of an X-ray detector with detector elements arranged in a matrix in conjunction with a stationarily arranged stray radiation grid. In this patent, the stray radiation grid is applied over the detector surface directly on the X-ray detector. The absorbent structural elements of the stray radiation grid are disposed at a distance from one another that is less than the expanse of the smallest resolvable detail in the X-ray image. The regularly arranged, absorbent structure elements therefore are imaged with such a high spatial frequency that they lie beyond the resolution of the X-ray detector. Since the spacing of the structural elements in the stray radiation grid cannot be selected arbitrarily small, a detector having an adapted, limited spatial resolution must be employed. This, however, leads to an undesirable reduction of the detective quantum efficiency (DQE) given high spatial frequencies.

SUMMARY OF THE INVENTION

An object of the present invention is to provide an arrangement composed of X-ray detector or a gamma detector having a stray radiation grid or collimator arranged thereover that exhibits a high primary ray transmissivity and produces no Moiré effects.

This object is achieved in accordance with the invention in a stray radiation grid or collimator of absorbent structure elements disposed over the detector surface of an X-ray or gamma detector having detector elements arranged in a matrix in row and column directions wherein the detector elements of the X-ray or gamma detector form a detector surface having detection regions sensitive to X-rays or gamma radiation with less sensitive or insensitive intermediate regions lying therebetween. The absorbent structural elements of the stray radiation grid or collimator proceed in the projection direction of the detector over the intermediate regions and are fashioned such that their detector-side center-to-center spacing in the row direction and/or column direction is greater by a whole-numbered factor than the center-to-center spacing of the detector elements in the same direction. Alternatively or additionally, sections of the absorbent structure elements that proceed in one direction can have a lower height than sections that proceed in the other direction.

As a result of the arrangement of the absorbent structure elements, which are usually thin webs or wall elements, over the intermediate regions of the detector surface, an arrangement composed of a stray radiation grid or a collimator and the detector arises wherein no Moiré effects whatsoever occur. A prerequisite for this is an adequately precise manufacture and positioning of the absorbent structure elements over or on the detector.

The manufacture can ensue with a rapid prototyping technique wherein a basic structure for the stray radiation grid or the collimator of a UV-hardened polymer is applied onto the surface of the detector, preferably with stereolithography, and is subsequently filled with a material that absorbs X-rays or gamma radiation. Such a rapid prototyping technique offers the advantage of a very exact manufacture of the absorbent structures with low thickness.

Dependent on the manufacturing method selected for the stray radiation grid or the collimator, it may not be possible to generate adequately thin structure elements that cover only the intermediate regions precisely, given detectors with a slight expanse of the intermediate regions. Given thicker structure elements, a part of the detection regions are then covered, so that a higher absorption of primary radiation occurs. The additional absorption of primary radiation is also intensified by the shadowing effects of the absorbent structure elements given a high shaft ratio.

This problem of the reduced primary radiation transmission is countered in the arrangement of the present invention by the center-to-center spacing of the absorbent structure elements being greater by a whole-numbered factor in at least one direction, i.e. in the row direction or in the column direction, than the center-to-center spacing of the detector elements in the same direction. This coarser rastering compared to the rastering of the pixel matrix of the detectors considerably increases the transparency for the primary radiation, but only slightly diminishes the suppression of the stray radiation given a suitable selection of the shaft ratio. A comparable, though slighter, effect is achieved when all sections of the structural elements proceeding parallel to a row are implemented with a lower height than the corresponding section in the column direction or vice versa.

The present arrangement also offers considerable advantages in applications, for example in slice tomography and in tomosynthesis, wherein the X-ray tube is laterally shifted, so that the radiation strikes the detector surface at an angle unequal to 90°. This leads to no problems in conventional stray radiation grids in the lamella direction; in matrix grids, however, a pronounced occlusion due to the defocusing immediately occurs. By designing the present stray radiation grid with a coarser division in the direction of the shift of the X-ray source than the detector matrix, the effective aperture becomes different in the row direction and the column direction and the effect of defocusing is clearly reduced.

Dependent on the desired effect, the absorbent structural elements in the inventive arrangement can extend over the detector surface on the intermediate regions in an arbitrary way. They can be fashioned as straight-line webs that intersect such as to form a quadratic or rectangular grid. A step-shaped course of the absorbent structure elements over the detector surface is also possible, and step height and step depth also can be different. An additional stabilization of these elements can be foregone as a result of a step-shaped course of mutually independent, absorbent structure elements. Such a stabilization may be necessary when the individual structure elements do not touch or cross. In this case, pass regions arise that extend continuously over the entire detector area. Cross-webs between the elements can also be formed for increasing the stability of structural elements that do not touch one another. Given utilization of the technique of stereolithography for generating the stray radiation grid or collimator, such cross-webs can be very easily integrated into the stray radiation grid or collimator. Further, the interspaces between the absorbent structure elements can be filled with a material that is essentially transparent for X-rays or gamma rays. Of course, the stray radiation grid in the present arrangement can be implemented as a focused stray radiation grid or as a non-focused stray radiation grid.

Arbitrary solid-state or semiconductor detectors can be utilized as detectors in the present arrangement. For example, an X-ray detector with an applied scintillator layer can be employed. A CdZnTe array detector can, for example, be employed as gamma detector.

DESCRIPTION OF THE PREFERRED EMBODIMENTS

Figure 1:
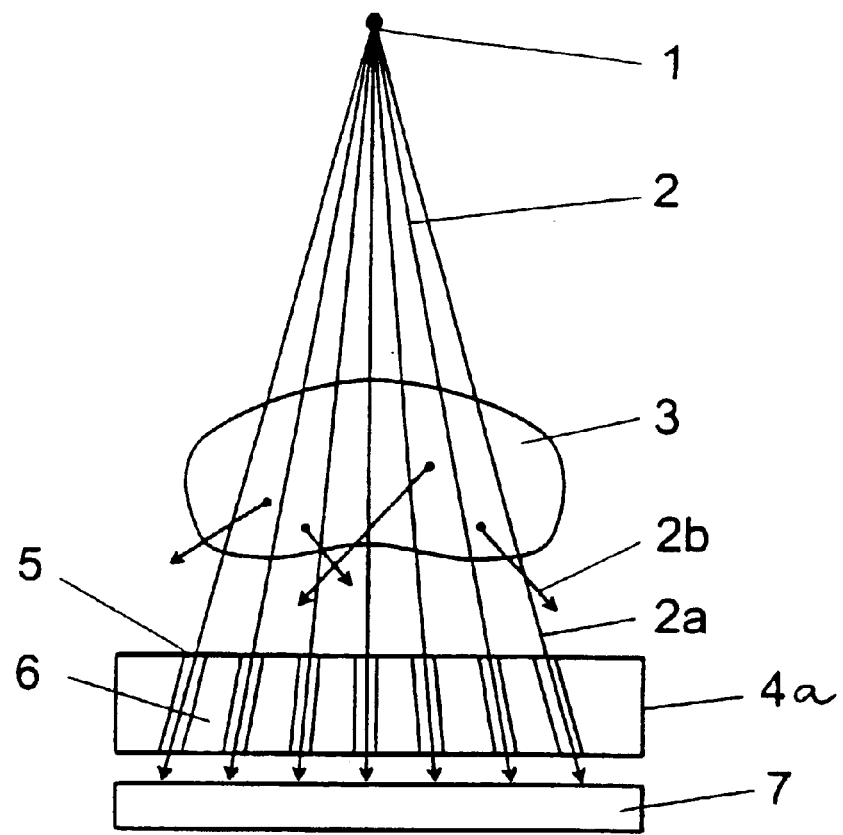
FIG. 1 depicts the relationships in the X-ray image exposure of a subject using a stray radiation grid.

The typical relationships in an X-ray image exposure of a subject 3 in X-ray diagnostics are schematically shown on the basis of FIG. 1. The subject 3 is situated between the tube focus 1 of an X-ray tube, which can be considered as an approximately punctiform X-ray source, and a detector surface 7. The X-rays 2 emanating from the focus 1 of the X-ray source propagate on straight lines in the direction of the X-ray detector 7 and thereby penetrate the subject 3. The primary rays 2a that penetrate the subject 3 on a straight line proceeding from the focus 1 and striking the detector surface 7 produce a spatially resolved attenuation value distribution for the subject 3 on the detector surface 7. Some of the X-rays 2 emanating from the X-ray focus are scattered in the subject 3. The scattered rays 2b that thereby arise do not contribute to the desired image information and considerably degrade the signal-to-noise ratio when they strike the detector 7. A stray radiation grid 4a therefore is arranged in front of the detector 7 for improving the image quality. This stray radiation grid 4a has through-channels 5 and absorbent regions 6. The through-channels 5 are aligned in the direction of the tube focus 1 so that they allow the incident primary radiation 2a to strike the detector surface on a straight-line path. Rays that are not incident in this direction, particularly the scattered rays 2b, are blocked or considerably attenuated by the absorbent regions 6. With known manufacturing techniques, however, the absorbent regions 6 can be only realized with a certain minimum thickness, so that a considerable part of the primary radiation 2a is still absorbed and does not contribute to the image result.

Figure 2:
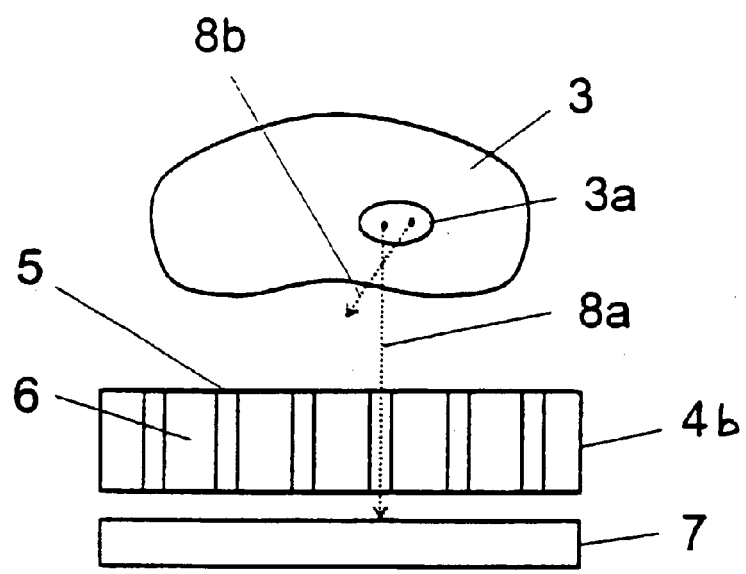
FIG. 2 depicts the relationships in a nuclear medicine exposure of the subject using a collimator.

FIG. 2 shows the relationships in the image exposure in nuclear diagnostics. The body 3 under examination can be seen in FIG. 2, an organ 3a being indicated in this body 3. By injecting an agent that emits gamma radiation and which is metabolized in the organ 3a, gamma quanta 8a are emitted from the region and are incident on the detector 7, an Anger camera. The projection direction of the image exposure is defined by a collimator 4b arranged in front of the detector 7. The collimator 4b has through-channels 5 aligned on a straight line between regions 6 that absorb gamma radiation. Gamma quanta 8b that are emitted in other directions or that are scattered and that do not come on a straight-line path from this projection direction are absorbed by the collimator 4b. Because the absorbent regions 6 cannot be arbitrarily thin, however, a considerable part of the primary radiation 8a is still absorbed in this technique.

Figure 3:
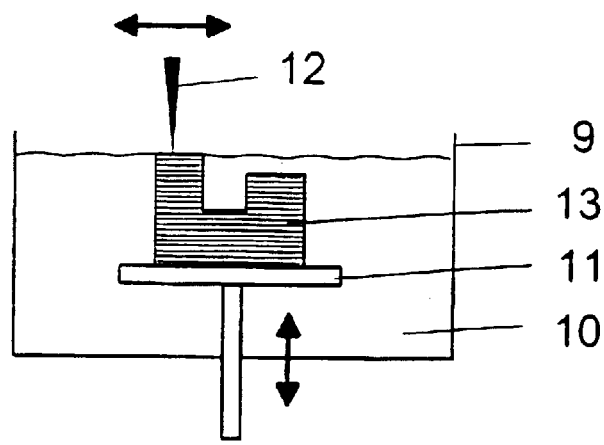
FIG. 3 illustrates the technique of stereolithography when building up a structure in accordance with the invention.

The present invention can be realized with a method that enables a very precise fabrication of stray radiation grids or collimators (collectively, imaging radiation-passing structures) with very thin absorbent elements or partitions 6 between the through-channels 5. A rapid prototyping technique is thereby utilized for the manufacture of the imaging radiation passing structure. An example of such a technique is stereolithography, as illustrated on the basis of the illustration in FIG. 3. In this technique, a UV laser beam 12 is directed onto the surface of a fluid UV-cross-linkable polymer 10 that is situated in a container 9. In order to build up the base member 13 in layers, the UV laser beam 12 moves across the surface of the fluid polymer 10 on the basis of a three-dimensional volume model of the base member 13 to be produced. After the solidification of a layer, this is lowered by a further layer thickness by a construction platform 11, so that the UV laser 12 can solidify the next layer in conformity with the three-dimensional volume model. In this way, the base member 13 of the cross-linked, UV-hardened polymer 10 is built up layer-by-layer. Very thin structures thus can be realized with very high precision due to the good focusability of the UV laser beam 12. The base member 13 can be built up directly on the construction platform 11, on an additional carrier plate that is not shown in FIG. 3, or directly on the surface of the X-ray or gamma detector. Further, a base plate can also be directly built up with the technique of stereolithography, the base member 13 then being formed thereon in conformity with the desired geometry.

Figure 4A:
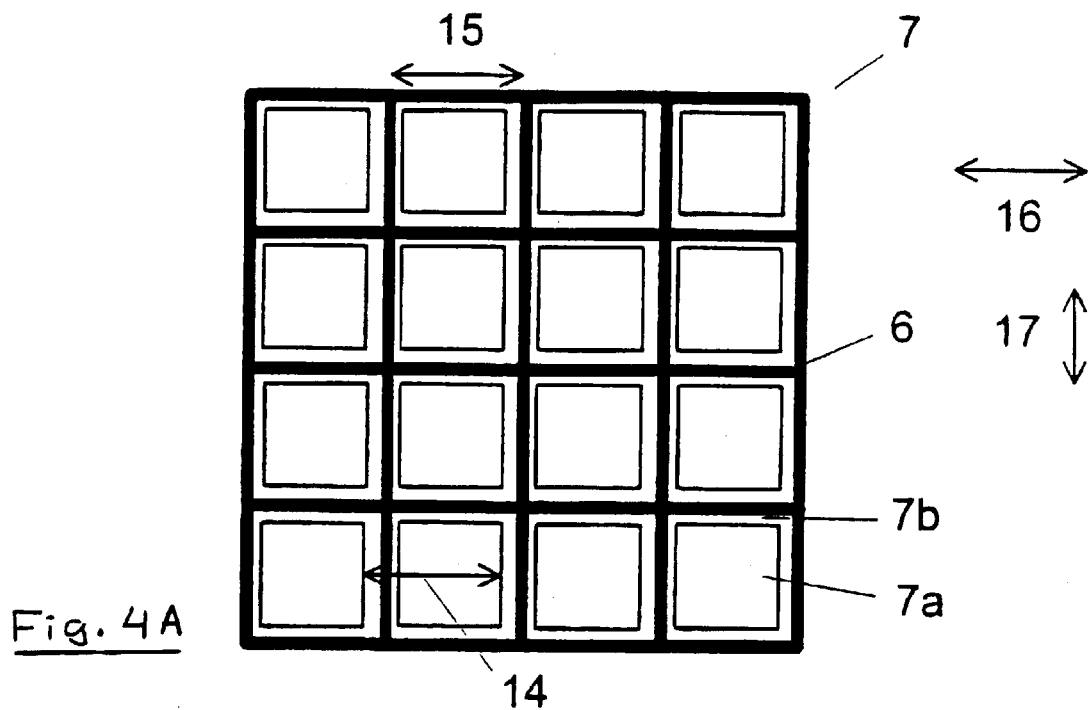
FIGS. 4A and 4B show a first exemplary embodiment of the inventive arrangement in a side view.

In the present exemplary embodiment, an excerpt from an X-ray detector 7 with detector elements arranged in a matrix can be seen in plan view in FIG. 4A. The detector elements are composed of radiation-sensitive detector regions 7a and radiation-insensitive intermediate regions 7b. The detector elements are also referred to below as pixels. For example, such an X-ray detector 7 can contain 3000×3000 pixels with dimensions of 143×143 $\mu$m. A stray radiation grid with absorbent structure elements 6 is generated by means of stereolithography on the detector surface formed by the detector elements. The absorbent structure elements thereby lie in the intermediate regions 7b. Given such a grid, the incident primary radiation can strike the radiation-sensitive detector regions 7a unimpeded, whereas stray radiation incident at a different angle is intercepted by the absorbent structure elements 6.

In the present example, the stray radiation grid is fashioned such that its structural elements proceeding in the row direction 16 are fashioned with a lower height than the elements proceeding in the column direction. This can be seen in the cross-sectional view of FIG. 4B. Given a movement of the radiation source in row direction, the majority part of the primary radiation can still always impinge the radiation-sensitive detector regions 7a in this way, whereas a significant attenuation of the primary radiation by the absorbent structure elements 6 occurs given a movement in column direction. The center-to-center spacing 15 of the absorbent structure elements in this example corresponds exactly to the center-to-center spacing 14 of the detector elements.

Figure 4B:
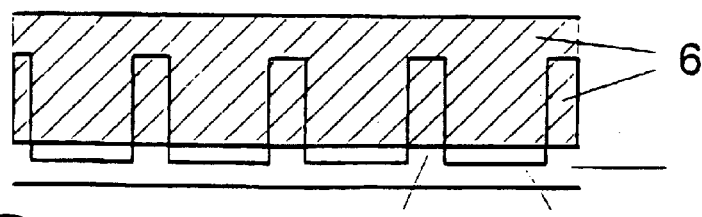
Figure 5:
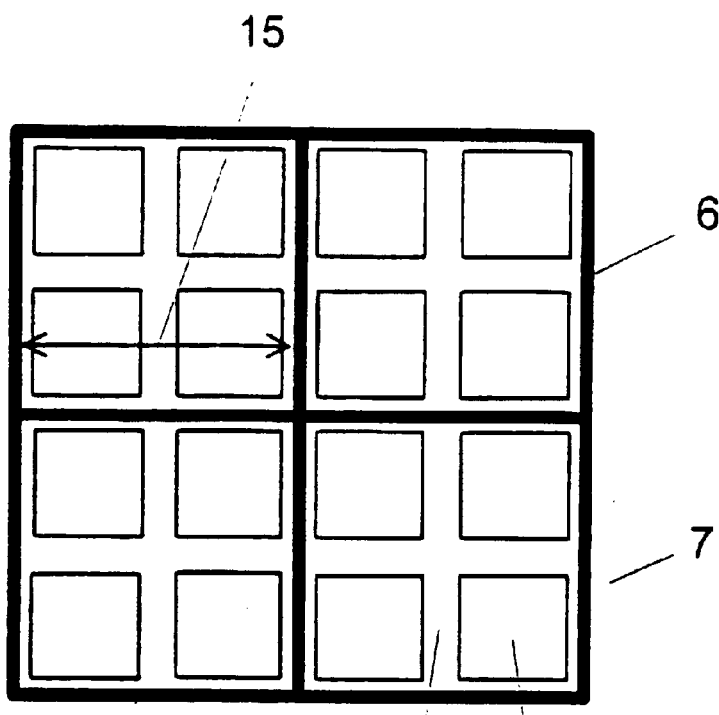
FIG. 5 is a plan view of a second exemplary embodiment of the inventive arrangement.

A wall thickness of 7.5 μm for the absorbent structure elements 6 would be ideal in a stray radiation grid like that of FIGS. 4A and 4B. Such a slight wall thickness, however, is difficult to realize given the current state of the art. In the exemplary embodiment of FIG. 5, the center-to-center spacing of the absorbent structure elements therefore is set to 286 μm in the row direction and in the column direction. The absorbent structure elements 6 are produced with a wall thickness of 15 μm. The grid dimension of the stray radiation grid of FIG. 5 that is coarser by a factor of 2 than the grid dimension of the detector pixels has the advantage that such a grid con be considerably more easily manufactured and produces no disturbing interference patterns whatsoever in the image exposure due to the illustrated application onto the detector surface.

Of course, even coarser grids can be produced, whereby the grid dimension in row direction must amount to n times and the grid dimension in column direction must amount to m times the center-to-center spacing of the detector elements. n and m are whole numbers.

Figure 6:
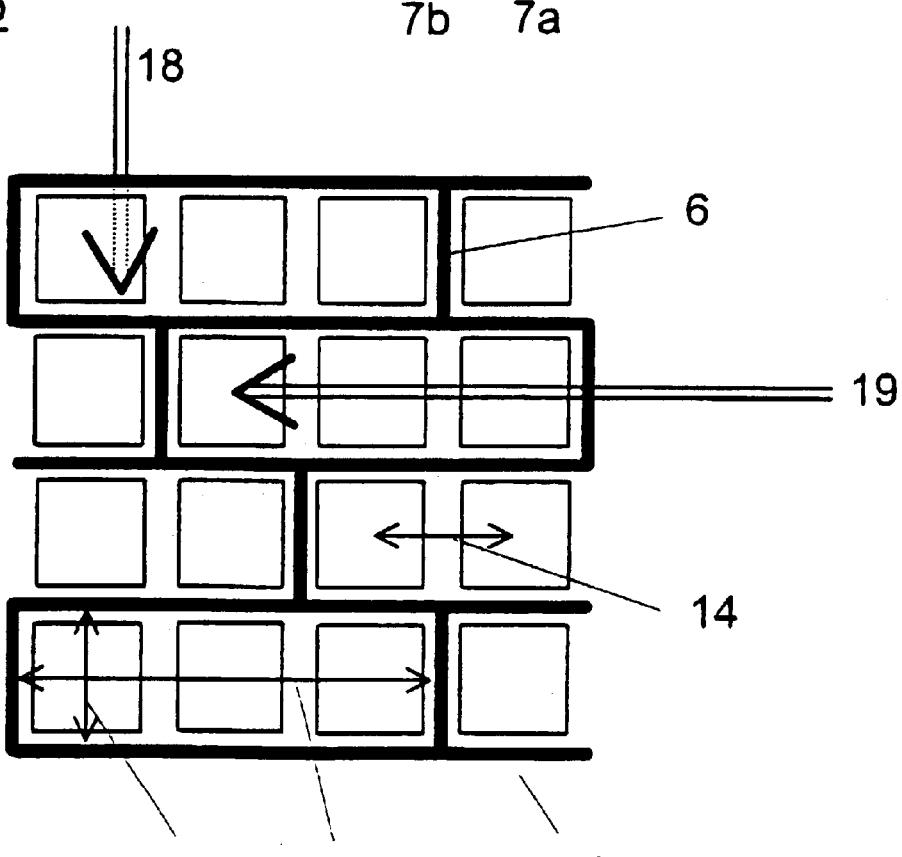
FIG. 6 is a plan view of a third exemplary embodiment of the inventive arrangement.

A grid that can be used for slice tomography or tomosynthesis is constructed according to the exemplary embodiment of FIG. 6. In this grid, n=3 and m=1 were selected, so that respectively 3 detector elements in row direction are enclosed by the absorbent structure elements 6 as a result of this arrangement. No absorbent structure element is formed between these respectively three enclosed detector elements. The center-to-center spacing 15a in row direction thereby corresponds to three times the center-to-center spacing 14 of the detector elements, whereas the center-to-center spacing 15b in the column direction corresponds exactly to the center-to-center spacing 14 of the detector elements. In this arrangement, obliquely incident radiation 19 from the row direction is only slightly attenuated, whereas obliquely incident primary radiation 18 from the column direction is highly attenuated. This configuration is particularly advantageous for tomosynthesis applications wherein the X-ray source moves in row direction relative to the detector 7, so that the defocusing produced as a result thereof has hardly any influence on the primary radiation transparency of the stray radiation grid. Additionally, the sections of the absorbent structure elements 6 proceeding in the column direction can be fashioned lower in this embodiment than those proceeding in the row direction.

Figure 9:
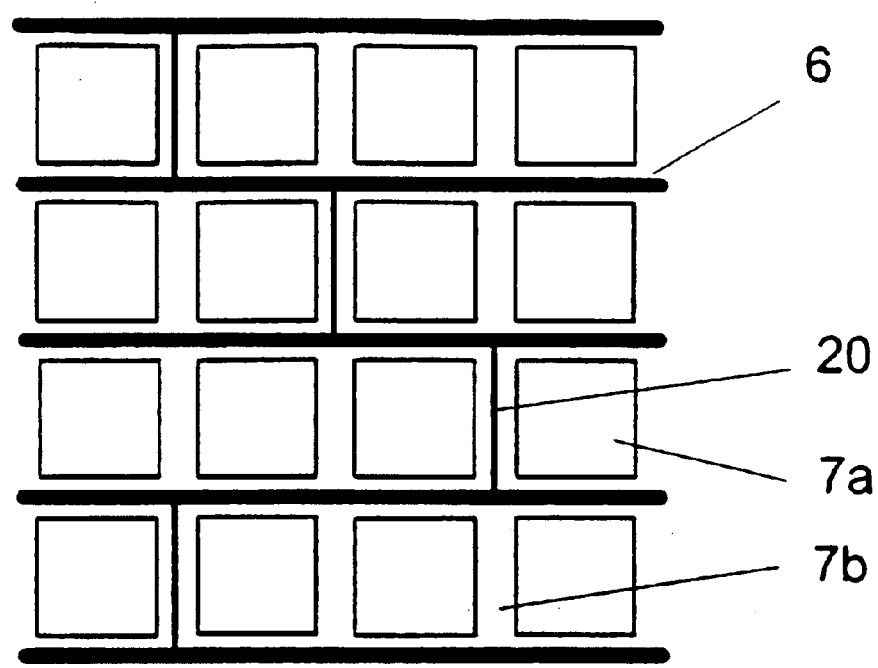
FIG. 9 shows an example for the arrangement of webs between absorbent structural elements of the stray radiation grid in accordance with the invention.

In a limit case of the present arrangement, a grid arises that, like a grid laid of lead lamellae, is composed only of structural elements 6 or strips in one direction (row direction or column direction). However, precautions must thereby be undertaken to assure the mechanical stability of the grid. Webs can be introduced in the transverse direction relative to the structural elements 6, such webs mutually supporting the structural elements 6. Such an embodiment is shown as an example in FIG. 9, which shows the non-absorbent cross-webs 20.

Alternatively, the interspaces between the structure elements 6 in this as well as in all other embodiments can be filled with a material that essentially does not absorb the incident primary radiation. Such a material can, for example, be a plastic that is transparent for X-rays.

Figure 7:
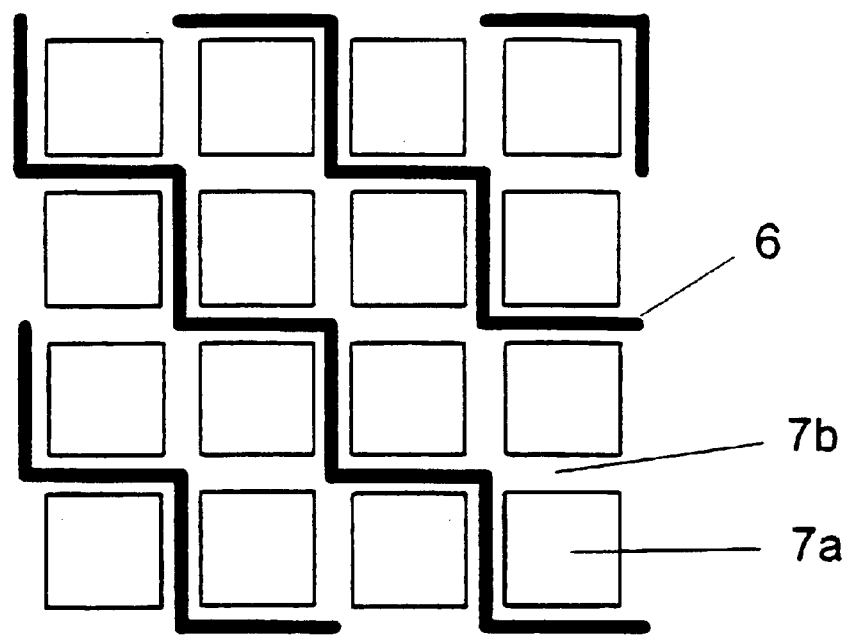
FIG. 7 is a plan view of a fourth exemplary embodiment of the inventive arrangement.
Figure 8:
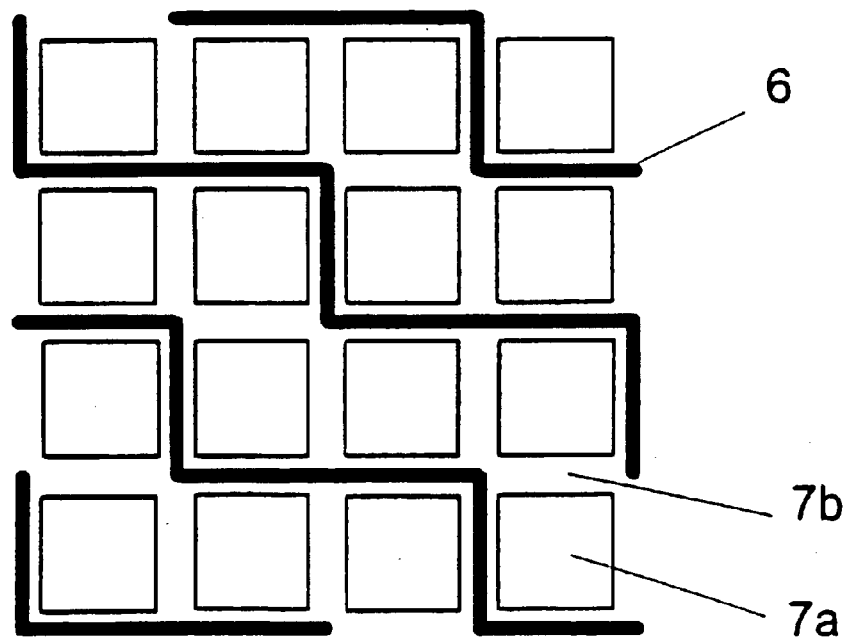
FIG. 8 is a plan view of a fifth exemplary embodiment of the inventive arrangement.

FIG. 7 shows another exemplary embodiment of the inventive arrangement, wherein the absorbent structure elements 6 proceed in steps over the detector surface. This stepped configuration makes it possible to achieve an improved stability of these structure elements on the detector surface. In a further embodiment shown in FIG. 8, the absorbent structure elements 6 are likewise stepped, but the depth and height of the steps are different.

The advantage of the inventive arrangement is that the stray radiation grids and collimators can be reproducibly as well as economically manufactured with, for example, stereolithography. Since the grids or collimators can be directly connected to the detector and the geometrical relationships between the detector and the grid (or collimators) thus always remain constant, a better long-term stability is achieved. It is self-evident that no limits are placed on the geometrical arrangement of the absorbent structure elements in the inventive arrangement. The only essential feature is that these structural elements 6 proceed in the interspaces that are not radiation-sensitive.

Although modifications and changes may be suggested by those skilled in the art, it is the intention of the inventors to embody within the patent warranted hereon all changes and modifications as reasonably and properly come within the scope of their contribution to the art.

We claim as our invention:

1. A detector arrangement comprising:
   a radiation detector selected from the group consisting of X-ray detectors and gamma detectors, said radiation detector having a plurality of detector elements disposed in a matrix in row and column directions which form a detector surface with detection regions that are sensitive to radiation, selected from the group consisting of X-rays and gamma radiation, and intermediate regions which are insensitive to said radiation; and
   a imaging radiation-passing structure, selected from the group consisting of stray radiation grids and collimators, disposed over said detector surface and having absorbent structural elements which proceed over said intermediate regions and which have a center-to-center spacing, at a side of said imaging radiation-passing structure facing said radiation detector, in at least one of said row direction and said column direction, which is greater by a whole-numbered factor than a center-to-center spacing of said detector elements in said one of said row direction and column direction.

2. A detector arrangement as claimed in claim 1 wherein said absorbent structural elements have sections proceeding in said one of said row direction and column direction and sections proceeding in the other of said row direction and column direction, and wherein said sections proceeding in said one direction have a lower height than said sections proceeding in the other direction.

3. A detector arrangement as claimed in claim 1 wherein said imaging radiation-passing structure is applied directly on said detector surface.

4. A detector arrangement as claimed in claim 1 further comprising an intermediate layer firmly connected to said detector surface, said imaging radiation-passing structure being disposed on said intermediate layer.

5. A detector arrangement as claimed in claim 1 wherein said absorbent structural elements proceed in straight lines over said detector surface.

6. A detector arrangement as claimed in claim 5 wherein said absorbent structural elements form a cellular grid.

7. A detector arrangement as claimed in claim 1 wherein said absorbent structural elements are stepped over said detector surface.

8. A detector arrangement as claimed in claim 1 wherein said absorbent structural elements comprise a plurality of discrete elements which do not cross each other and do not touch each other.

9. A detector arrangement as claimed in claim 8 further comprising cross-webs disposed between said discrete elements for stabilizing said discrete elements.

10. A detector arrangement as claimed in claim 1 wherein said absorbent structural elements have interspaces therebetween, and further comprising a material filling said interspaces which is substantially transparent to said radiation.

11. A detector arrangement as claimed in claim 1 wherein said imaging radiation-passing structure is a focused structure.

12. A detector arrangement comprising:
a radiation detector selected from the group consisting of X-ray detectors and gamma detectors, said radiation detector having a plurality of detector elements disposed in a matrix in row and column directions which form a detector surface with detection regions that are sensitive to radiation, selected from the group consisting of X-rays and gamma radiation, and intermediate regions which are insensitive to said radiation; and
a imaging radiation-passing structure, selected from the group consisting of stray radiation grids and collimators, disposed over said detector surface and having absorbent structural elements which proceed over said intermediate regions and having sections proceeding in said row direction and sections proceeding in said column direction, and wherein the sections proceeding in one of said row direction and said column direction have a lower height than said sections proceeding in the other of said row direction and column direction.

13. A detector arrangement as claimed in claim 12 wherein said imaging radiation-passing structure is applied directly on said detector surface.

14. A detector arrangement as claimed in claim 12 further comprising an intermediate layer firmly connected to said detector surface, said imaging radiation-passing structure being disposed on said intermediate layer.

15. A detector arrangement as claimed in claim 12 wherein said absorbent structural elements proceed in straight lines over said detector surface.

16. A detector arrangement as claimed in claim 15 wherein said absorbent structural elements form a cellular grid.

17. A detector arrangement as claimed in claim 12 wherein said absorbent structural elements are stepped over said detector surface.

18. A detector arrangement as claimed in claim 12 wherein said absorbent structural elements comprise a plurality of discrete elements which do not cross each other and do not touch each other.

19. A detector arrangement as claimed in claim 18 further comprising cross-webs disposed between said discrete elements for stabilizing said discrete elements.

20. A detector arrangement as claimed in claim 12 wherein said absorbent structural elements have interspaces therebetween, and further comprising a material filling said interspaces which is substantially transparent to said radiation.

21. A detector arrangement as claimed in claim 12 wherein said imaging radiation-passing structure is a focused structure.

* * * * *